United States Patent
Plessier

(10) Patent No.: US 7,715,551 B2
(45) Date of Patent: May 11, 2010

(54) APPARATUS AND METHOD FOR CONSISTENCY CHECKING PUBLIC KEY CRYPTOGRAPHY COMPUTATIONS

(75) Inventor: Bernard Plessier, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 1222 days.

(21) Appl. No.: 10/835,102

(22) Filed: Apr. 29, 2004

(65) Prior Publication Data
US 2005/0243998 A1    Nov. 3, 2005

(51) Int. Cl.
*H04L 9/00* (2006.01)
(52) U.S. Cl. .......................................................... 380/2
(58) Field of Classification Search ....................... 380/2
See application file for complete search history.

(56) References Cited

U.S. PATENT DOCUMENTS

| | | | | |
|---|---|---|---|---|
| 5,724,279 | A  * | 3/1998 | Benaloh et al. ............. | 708/491 |
| 6,163,790 | A  * | 12/2000 | Monier ........................ | 708/491 |
| 6,853,988 | B1 * | 2/2005 | Dickinson et al. ............ | 705/75 |
| 7,249,108 | B1 * | 7/2007 | Walmsley et al. ............. | 705/64 |
| 2002/0059353 | A1 * | 5/2002 | Koc et al. .................... | 708/491 |
| 2002/0095594 | A1 * | 7/2002 | Dellmo et al. ............... | 713/200 |
| 2002/0152385 | A1 * | 10/2002 | Vanstone et al. ............ | 713/176 |
| 2003/0065696 | A1 * | 4/2003 | Ruehle et al. ................ | 708/491 |
| 2003/0149883 | A1 * | 8/2003 | Hopkins et al. ............. | 713/191 |
| 2003/0156715 | A1 * | 8/2003 | Reeds et al. .................. | 380/37 |
| 2004/0148547 | A1 * | 7/2004 | Thompson et al. ........... | 714/22 |
| 2005/0229254 | A1 * | 10/2005 | Singh et al. ................... | 726/23 |

* cited by examiner

*Primary Examiner*—Eleni A Shiferaw
*Assistant Examiner*—Michael S McNally
(74) *Attorney, Agent, or Firm*—Lisa K. Jorgenson; William A. Munck

(57) ABSTRACT

A cryptographic system comprising: 1) a first Montgomery-based cryptographic engine that receives a first operand and a second operand and generates a first result and 2) a second Montgomery-based cryptographic engine that receives a first reduced operand derived from the first operand and a second reduced operand derived from the second operand and generates a second result. The second Montgomery-based cryptographic engine operates in parallel with the first Montgomery-base cryptographic engine. The cryptographic system further comprises a comparator for comparing the second result to a first reduced result derived from the first result and generating an error flag if the second result and the first reduced result are different.

20 Claims, 6 Drawing Sheets

NOTE: $R_0$ TO $R_{31}$ ARE ALL ZEROS
AND $R = S + A<1> B + YN$

APPARATUS AND METHOD FOR CONSISTENCY CHECKING PUBLIC KEY CRYPTOGRAPHY COMPUTATIONS

TECHNICAL FIELD OF THE INVENTION

The present invention relates generally to cryptography systems and, more specifically, to a consistency checking apparatus for detecting disruptive attacks on a cryptographic engine.

BACKGROUND OF THE INVENTION

The demand for improved security and privacy has led to the incorporation of cryptographic engines in a wide range of communication systems and data processing systems. Many of these cryptographic engines use public key cryptography algorithms (RSA, DSA, El-Gamal) that rely on modular arithmetic to crypt/decrypt messages. The basic operation used in these algorithms is a modular multiplication, which computes R=AB mod N, where A, B and N are large numbers, typically with hundreds of digits.

Implementation of this basic operation has been made quite efficient thanks to Montgomery's theorem, which provides a multiplication technique for computing R without a long division by N to obtain the remainder. Practical implementations of Montgomery multiplication decompose A into k blocks of p bits to limit the size of the intermediate numbers (i.e., there is no need to store the product AB explicitly).

FIG. 1 illustrates prior art cryptographic engine 110, which is based on Montgomery multipliers. Cryptographic engine 110 receives the parallel input $A_i$ and the serial inputs B[j] and N[j] and produces the serial output (or result) R[j]. The parallel input $A_i$ is stored in register 115 in cryptographic engine 110. It is assumed that N is an odd integer and that both A and B are integers smaller than N. The sizes of A, B and N are on the order of several hundred bits.

Most common implementations that compute R=AB mod N are based on the Montgomery's interleaved multiplication. The input data A, B, S and N enter cryptographic engine in a serial fashion (one or more bit at each cycle). The output data, R, is obtained serially. The following equations summaries the basic operations carried by Montgomery-based cryptographic engine 110:

$$T = S + (A_i \cdot B) \quad \text{[Eqn. 1]}$$

$$Y = (T \cdot J) \bmod 2^P \quad \text{[Eqn. 2]}$$

$$R = (T + N \cdot Y)/2^P \quad \text{[Eqn. 3]}$$

where J is a p-bit constant, such that $J \cdot N_0 = -1 \bmod 2^P$, and $A_i$ is the ith block of p bits of A. The number p is usually a power of 2, such as 32 or 64. The numbers J and Y are stored internally in the registers of cryptographic engine 110. The final result A.B mod N is obtained by iterating the Equation 1, 2 and 3 over each block of p bit of A with the number S of the current iteration being equal to the number R of the previous iteration. Initially, S is zero.

However, cryptographic engines are often the prime targets of hacker attacks in which hostile parties attempts to discover the secret encryption keys. These attacks may take a number of forms, including invasive (e.g., physical probing), non-invasive (e.g., current probing), and disruptive (e.g., fault injection). Cryptographic researchers have extensively studied these types of attacks extensively and have added a number of hardware and software countermeasures to conventional cryptographic engines to minimize the impact of such attacks.

Disruptive attacks are of particular concern. Disruptive attacks inject a fault (e.g., sudden voltage drop) during cryptographic computations and these faults may corrupt the computation results. Unfortunately, in the current state-of-the-art cryptographic devices, it is impossible to verify whether or not the computation engine returns correct result for S.

Therefore, there is a need in the art for an improved cryptographic engine. In particular, there is a need for an apparatus and method for verifying the results from a cryptographic engine that may be subject to a disruptive attack.

SUMMARY OF THE INVENTION

The present invention overcomes the shortcomings of the prior art cryptographic engines by the addition of a relatively small hardware engine that performs simple operations on a digest of the two operands A and B, returning a result $R_r$, in parallel with the main computation. The reduced result $R_r$ is compared to a digest of the main result, R. If the numbers are different, then the integrity of the computation has been compromised. The probability of error detection depends on the size of $R_r$.

To address the above-discussed deficiencies of the prior art, it is a primary object of the present invention to provide a redundant cryptographic system. According to an advantageous embodiment of the present invention, the cryptographic system comprises: 1) a first Montgomery-based cryptographic engine capable of receiving a first operand and a second operand and generating therefrom a first result; and 2) a second Montgomery-based cryptographic engine capable of receiving a first reduced operand derived from the first operand and a second reduced operand derived from the second operand and generating therefrom a second result. The second Montgomery-based cryptographic engine operates in parallel with the first Montgomery-base cryptographic engine.

According to another embodiment of the present invention, the cryptographic system further comprises a comparator for comparing the second result to a first reduced result derived from the first result and generating an error flag if the second result and the first reduced result are different.

According to still another embodiment of the present invention, the cryptographic system further comprises a first reduction engine for reducing the first operand from an N-bit value to a P-bit value, thereby producing the first reduced operand.

According to yet another embodiment of the present invention, the cryptographic system further comprises a second reduction engine for reducing the second operand from an M-bit value to a P-bit value, thereby producing the second reduced operand.

According to a further embodiment of the present invention, the cryptographic system further comprises a third reduction engine for reducing the first result from an R-bit value to a P-bit value, thereby producing the first reduced result.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 2 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged cryptographic system.

Figure 1:
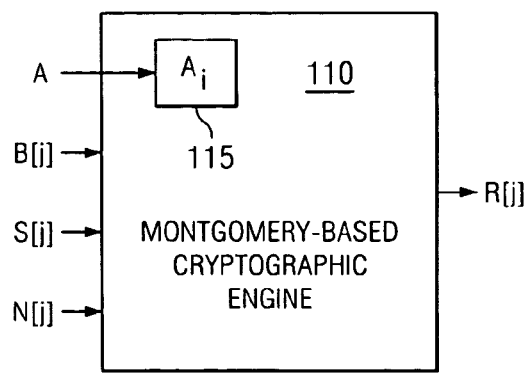
FIG. 1 illustrates a prior art cryptographic engine based on Montgomery's theorem.
Figure 2:
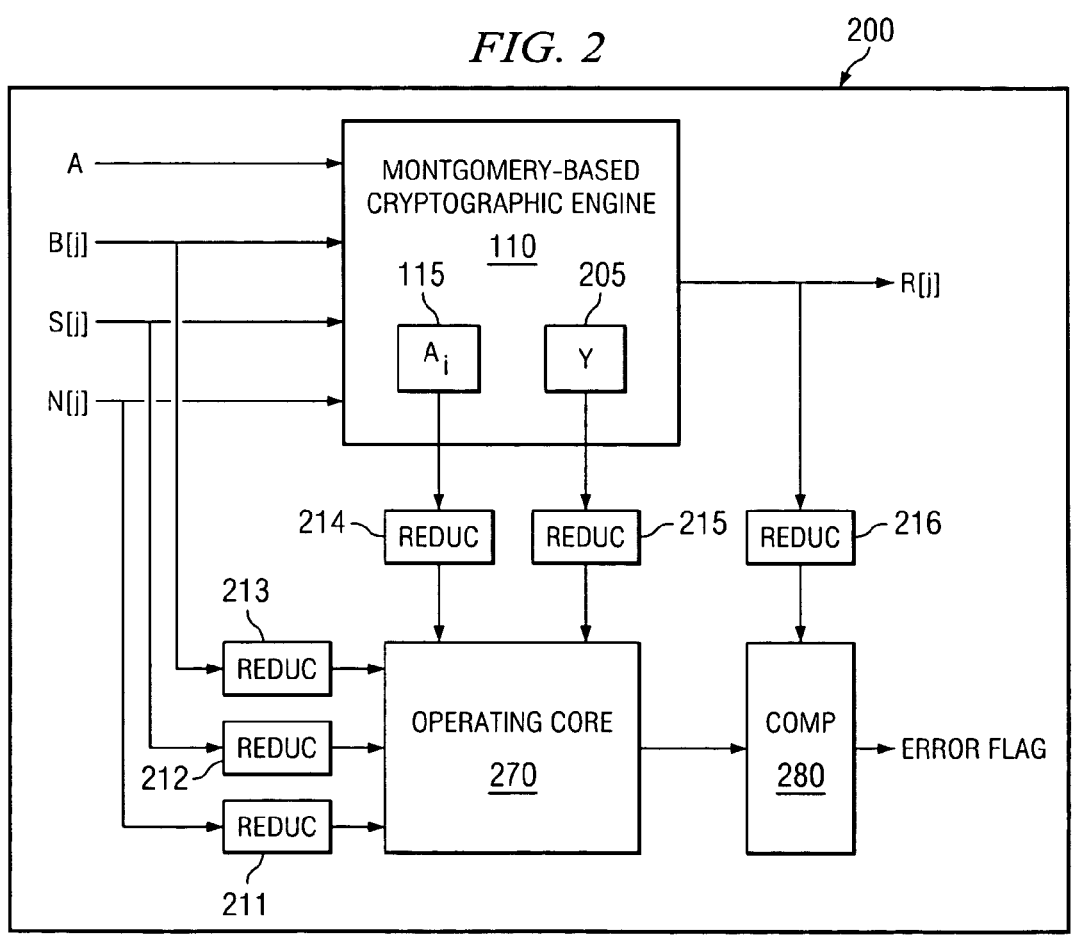
FIG. 2 illustrates a cryptographic system according to an exemplary embodiment of the present invention.

FIG. 2 illustrates cryptographic system 200 according to the principles of the present invention. Cryptographic system 200 may be implemented in a data processor, a wireless transceiver, a wireline transceiver, and many other types of communication systems. Cryptographic system 200 comprises conventional Montgomery-based cryptographic engine 110, reduction engines 211-216, operation core 270 and comparator 280. To detect faults in conventional cryptographic engine 110, a small cryptographic engine (operation core 270) carries out similar operations in parallel with cryptographic engine 110 using reduced input arguments. At the end of the computations, comparator 280 compares the results of both engines.

Conventional Montgomery-based cryptographic engine 110 receives the serial inputs B[j], S[j] and N[j], where the index j represents the jth bit of B, S or N. Conventional Montgomery-based cryptographic engine 110 also receives the parallel input $A_i$, where the index i represents the ith block of p bits of the number A. Conventional Montgomery-based cryptographic engine 110 outputs the serial result R[j], where the index j represent the jth bit of R. Conventional Montgomery-based cryptographic engine 110 comprises registers 115 and 205. Register 115 stores the value of $A_i$. Register 205 stores the value of Y, which is a p-bit number derived from $A_i$, B and N that is found in all Montgomery-based multipliers.

The serial input data, B[j], S[j] and N[j], enter reduction engines 211, 212 and 213, each of which computes a digest of the given input data in a serial manner. In parallel with this operation, the serial output result, R[j], also enters reduction engine 216, which produces a digest of the result. The values of $A_i$ and Y from conventional Montgomery-based cryptographic engine 110 are input to reduction engines 214 and 214, respectively.

Each reduction engine stores a 4-bit or an 8-bit digest number. These digest numbers are then input to the digest operating core 270. Operating core 270 returns a 4-bit or 8-bit number to be compared with the digest of the output result from reduction engine 216. If these two numbers are not the same, then the computation is incorrect and Error Flag is set for any subsequent hardware or software actions.

The choice of the number of bits for the reduction engines influences the size of the hardware as well as the probability of error detection. Because the present invention relies on digest numbers rather than the entire serial input numbers, there is a possibility that errors may be undetected through the well-known aliasing problem. The probability of undetected error is inversely proportional to the number of bits in the digest.

The theory behind the present invention may be explained as follows. Let e be a divisor of p and let the numbers E and F be defined such that:

$$E=2^e \quad \text{[Eqn. 4]}$$

$$F=E-1 \quad \text{[Eqn. 5]}$$

A positive integer can be represented as the sum of k blocks of e bits or as the sum of k' blocks of p bits. We have for number X:

$$X = \sum_{i=0}^{k'-1} X\langle i\rangle 2^{pi} = \sum_{i=0}^{k-1} X[i]E^i = \sum_{i=0}^{ek-1} X_i 2^i \quad \text{[Eqn. 6]}$$

with $0<=X_i<2$, $0<=X[i]<2^e$, and $0<=X\langle i\rangle<2^p$.

It can be easily proven that:

$$X \bmod F = \left(\sum_{i=0}^{k-1} X[i]\right) \bmod F \quad \text{[Eqn. 7]}$$

The right hand side of Equation 7 is defined as the reduction function of number X and uses the notation red(X) to simplify the writing. This is the function performed by reduction engines 211-216. Stated verbally, the reduction of X with respect to a number k is obtained by summing all the digits of X when represented in base k and then taking the rest of the division modulo k−1. When X is represented as an n-bit binary number, it is advantageous to choose k as a power of 2 ($k=2^p$), such that each digit of X in base k is a p-bit number.

The following equations can be easily proven:

$$\text{red}(X+Y)=\text{red}(\text{red}(X)+\text{red}(Y)) \quad \text{[Eqn. 8]}$$

$$\text{red}(X-Y)=\text{red}(\text{red}(X)\cdot\text{red}(Y)) \quad \text{[Eqn. 9]}$$

It is easy to compute the reduction of $R\cdot 2^p$ by successive application of Equations 8 and 9 above. This gives the result:

$$\text{red}(R\cdot 2^p) = \quad \text{[Eqn. 10]}$$
$$\text{red}(\text{red}(S)+\text{red}(\text{red}(A_i)\cdot\text{red}(B))+\text{red}(\text{red}(N)\cdot\text{red}(Y))))$$

The left hand side can be further simplified by observing that the reduction of $2^p$ is 1. This gives the result:

$$\text{red}(R) = \quad \text{[Eqn. 11]}$$
$$\text{red}(\text{red}(S)+\text{red}(\text{red}(A_i)\cdot\text{red}(B))+\text{red}(\text{red}(N)\cdot\text{red}(Y))))$$

This result represents the main theoretical result and is the foundation of the error detection engine according to the principles of the present invention.

Figure 3:
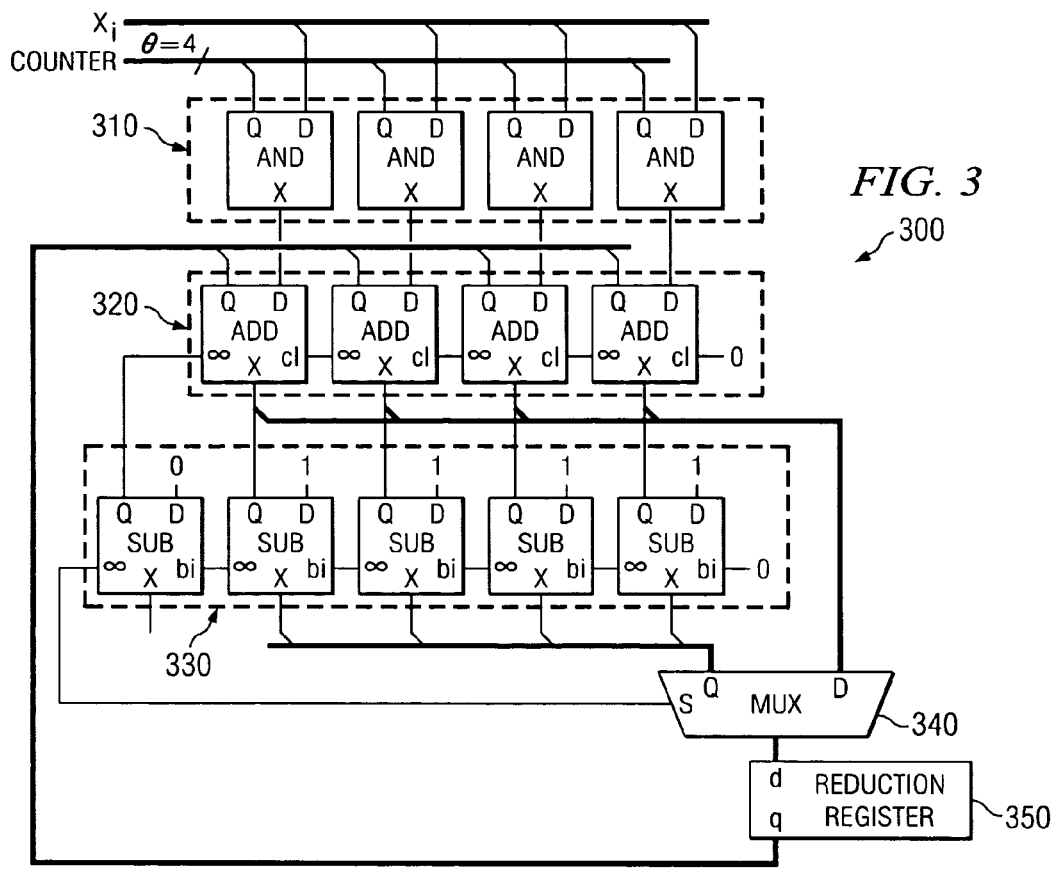
FIG. 3 illustrates an exemplary reduction engine for reducing a serial value into a digest value according to the principles of the present invention.
Figure 4:
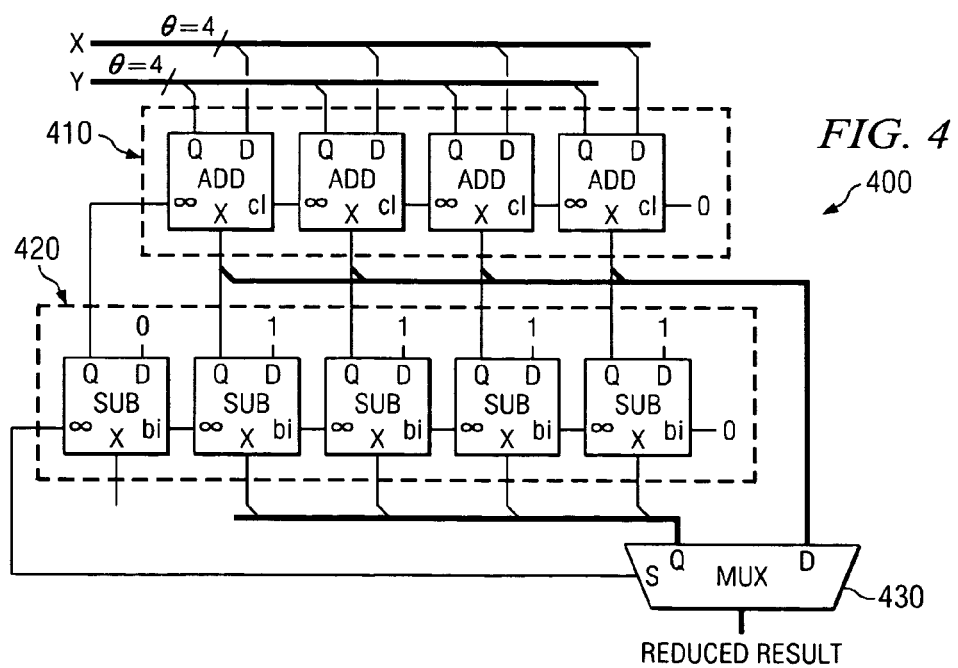
FIG. 4 illustrates an addition with reduction circuit according to an exemplary embodiment of the present invention.
Figure 5:
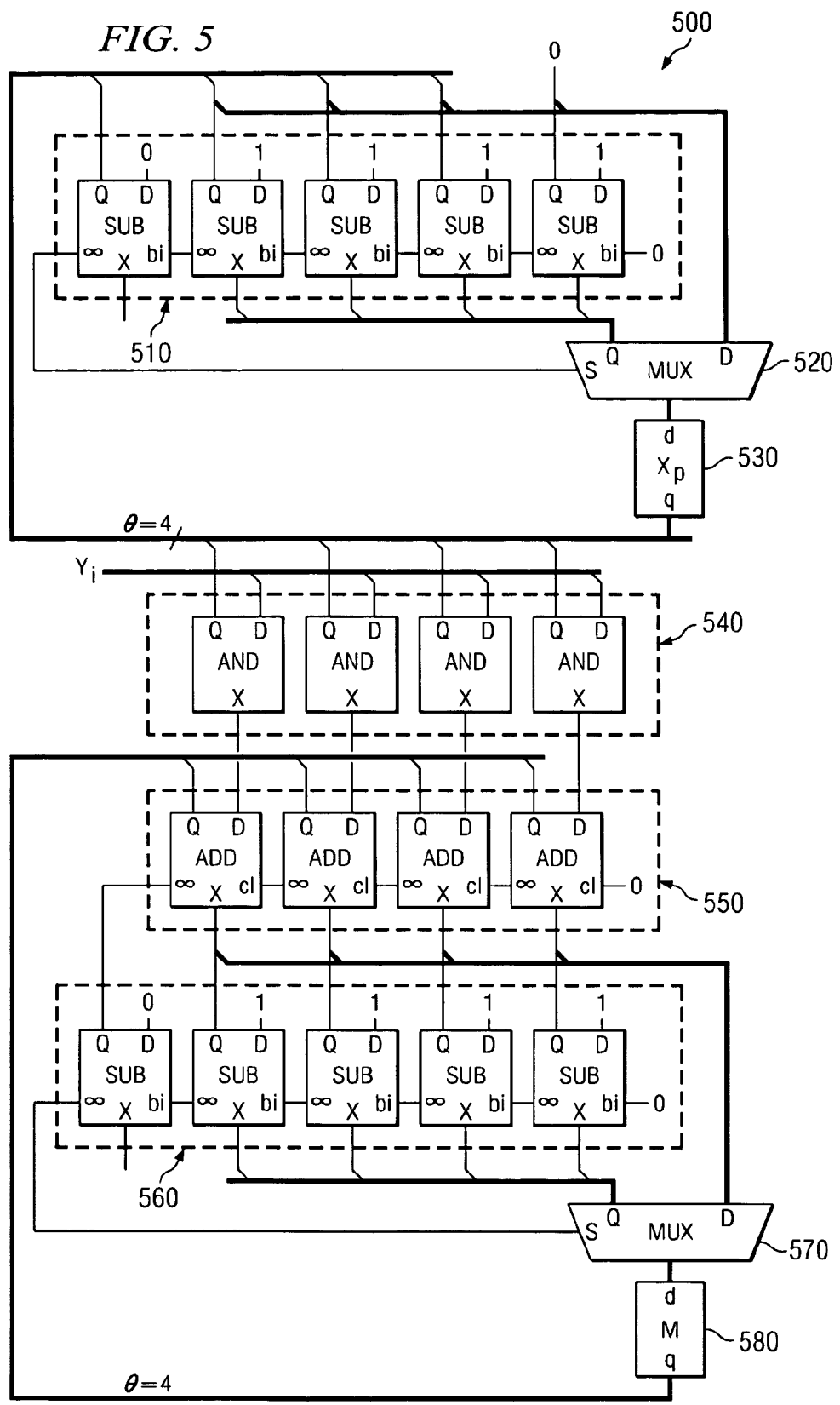
FIG. 5 illustrates a multiplication with reduction circuit according to an exemplary embodiment of the present invention.

FIGS. 3-5 illustrate examples based on an architecture where the serial data width is 1 bit and the digest is 4 bits. This should not be construed as a limitation of the present invention, since the theoretical results above show that larger data widths and digest values are also possible.

FIG. 3 illustrates exemplary reduction engine 300, which reduces a serial value into a digest value according to the principles of the present invention. Reduction engine 300 represents any one of reduction engines 211-216. Reduction engine 300 comprises a block of AND gates 310, a block of adders 320, a block of subtractors 330, multiplexer (MUX) 340, and reduction register 350.

The reduction operation (i.e., the computation of red(X)) is based on the following interactive formula:

$$X(t+1)=(X[t]+X(t))\bmod F \quad \text{[Eqn. 12]}$$

with $X(0)=0$, so that at the end, we have:

$$X(k+1)=\text{red}(X) \quad \text{[Eqn. 13]}$$

The reduction operation is carried in a serial fashion on each incoming or outgoing bit stream. This operation uses an e-bit counter (e.g., 4 bits), which starts at 1 and increments by a factor of 2 at each cycle up to $2^{e-1}$. The next value after $2^{e-1}$ is 1. Such counter can be implemented very easily with a rotating register. Let $2^{Ci}$ be the value of the counter after the ith cycle. A bitwise AND operation by AND gate 310 between the value of the bit steam at the ith cycle $X_i$ and $2^{Ci}$ is performed. The result is either 0 or $2^{Ci}$, which is added by adders 320 to the current reducted value in reduction register 350.

Subtractors 330 subtract the value F from the result of the addition. If the value from subtractors 330 is greater than or equal to 0, the new reducted value is the output of subtractors 330, otherwise it is the output of adders 320. It is therefore guarantee that the reducted value is strictly lower than F at all time.

FIG. 4 illustrates addition with reduction circuit 400 according to an exemplary embodiment of the present invention. Addition with reduction circuit 400 comprises a block of adders 410, a block of subtractors 420, and multiplexer (MUX) 430. Addition with reduction circuit 400 performs the operation red(X+Y), where X and Y are two positive integers strictly less than F. Adders 410 add X and Y and substractors 420 subtract F from the result. If the value from subtractors 420 is greater than or equal to 0, the new reducted value is the output of subtractors 420. Otherwise, it is the output of adder 410.

FIG. 5 illustrates multiplication with reduction circuit 500 according to an exemplary embodiment of the present invention. Multiplication with reduction circuit 500 comprises a block of subtractors 510, multiplexer (MUX) 520, $X_p$ register 530, a block of AND gates 540, a block of adders 550, a block of subtractors 560, multiplexer (MUX) 570 and M register 580. Multiplication with reduction circuit 500 performs the operation red(X·Y), where X and Y are two positive integers strictly less than F.

The timing budget allows this operation to be done sequentially using two bit e registers. The first register, $X_p$ register 530, is initialized with value X. At each cycle, the new value is given by $X_p>=\text{red}(X_p+X_p)$, thus computing the reduced values of 2x, 4x, ... up to $2^{e-1}$x. The second register, M register 580, is the result register. It is initialized at zero and its new value is given by:

$$M<-\text{red}(M+X_{pi}) \text{ if } Y_i=1 \quad \text{[Eqn. 14]}$$

$$M<-\text{red}(M) \text{ if } Y_i=0. \quad \text{[Eqn. 15]}$$

The final result is available once all the bits Y are processed.

Figure 6:
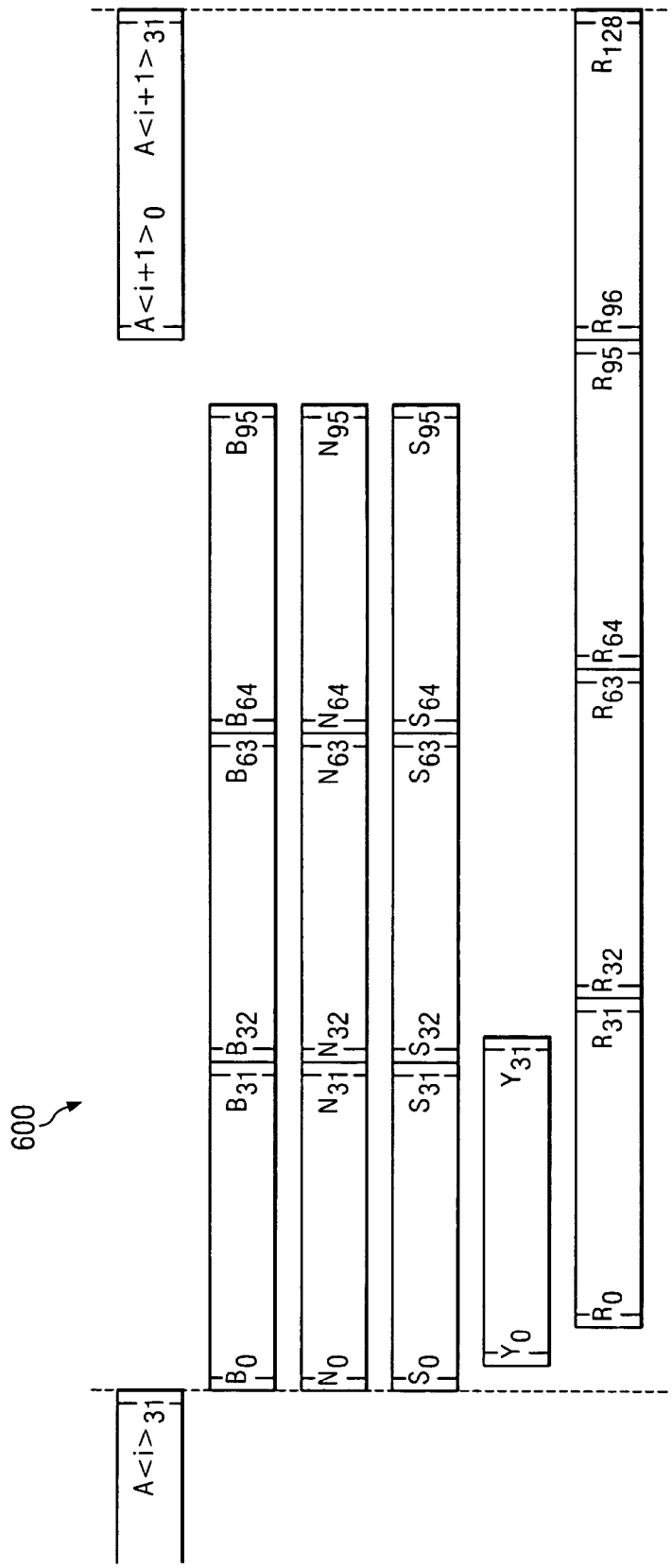
FIG. 6 is a timing diagram illustrating the operation of a prior art Montgomery-based cryptographic engine.

FIG. 6 depicts timing diagram 600, which illustrates the operation of a prior art Montgomery-based cryptographic engine. In FIG. 6, the numbers B, S and N are decomposed into 3 blocks of 32 bits. In FIG. 6, the term A<i> is equivalent to $A_i$. It is assumed that the number $A_i$ is already loaded in the Montgomery-based engine. In conventional implementations, this is done during the cycle of the round i−1.

At cycle j of round I, the bits $B_j$, $S_j$ and $N_j$ are the inputs. After a latency of $1_y$ cycles, the bits from Y become available. After a further latency of $1_R$ cycles, the result bit $R_{jR}$ is available on the output. The latency cycles are usually between 1 and 5, depending on the implementation.

Figure 7:
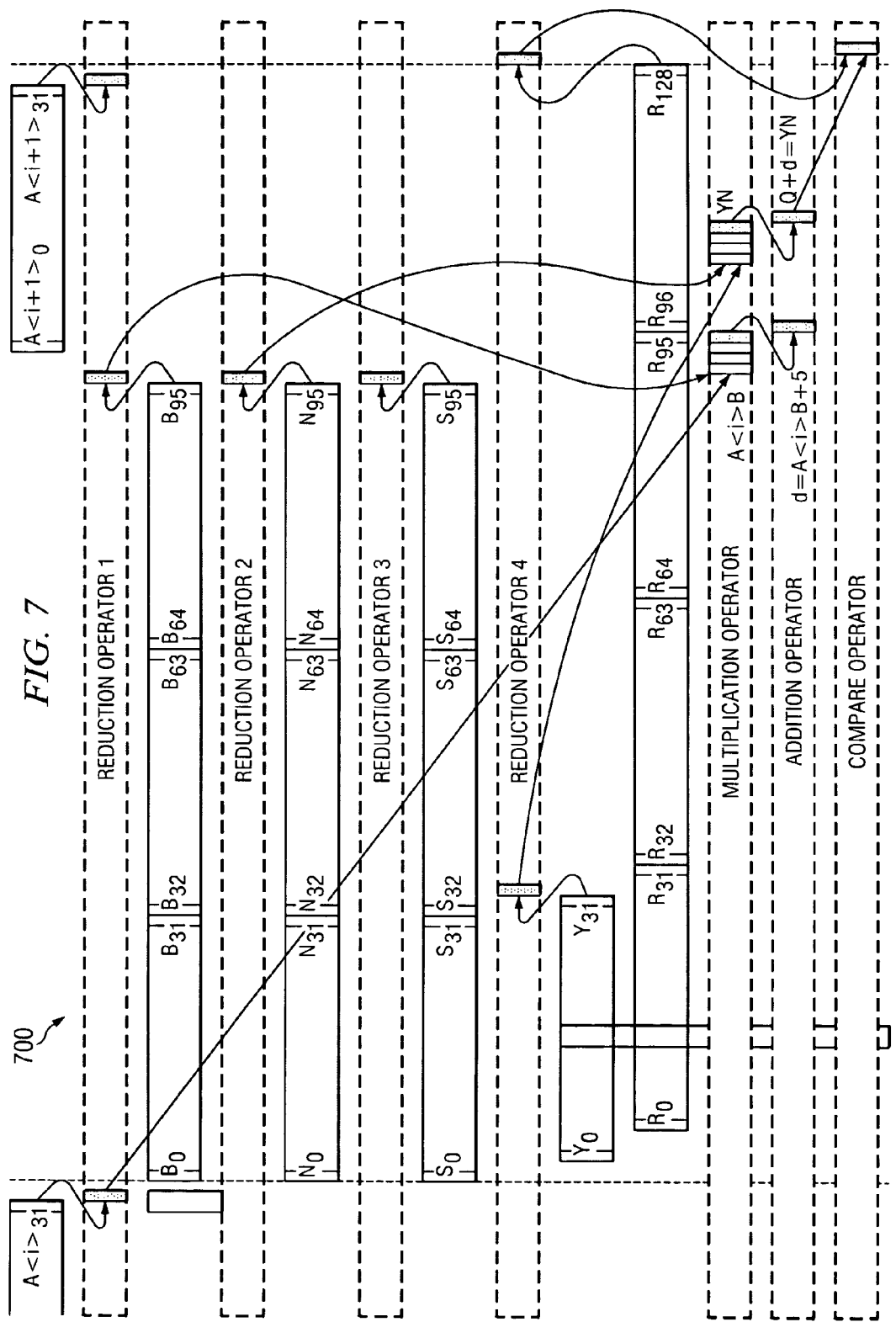
FIG. 7 is a timing diagram illustrating the operation of a Montgomery-based cryptographic engine according to the principles of the present invention.

FIG. 7 depicts timing diagram 700, which illustrates the operation of a Montgomery-based cryptographic engine according to the principles of the present invention. The present invention implements a schedule for the reduction operations, thereby minimizing the amount of hardware resources. In FIG. 7, the term A<i> is equivalent to $A_i$. It is noted from FIG. 6 that the processing of $A_i$ and the processing of B are separate in time. Also, it is noted that the processing of Y and the processing of R overlap, but during that time, the bits of R are guarantee to be zero. As a consequence, only 4 reduction engines are needed. Thus, $A_i$ is shared with B, and N, S and Y are shared with R.

The operations red(red(B)·red($A_i$)) and red(red(N)·red(J))

can only take place once all the bits of B and N have been loaded (i.e., cycle 96 in FIG. 7). These two operations can be done in series, so only one serial reducing multiplier is needed. The reduced sum red(red(S)+red(red(red($A_i$)·red(B))+red(red(N)·red(Y))))

is carried in 2 consecutive cycles, as follows:

$t_1$=red(red(S)+red(red(red($A_i$)·red(B))) and $t_2$=red($t_1$+red(red(N)·red(Y))).

This allows further minimization of the hardware with only one reducting adder.

The final operation to be scheduled is the compare operation between $t_2$ and red(R), which can only take place once all the bits of R are available (i.e., cycle $128+1_R$).

Figure 8:
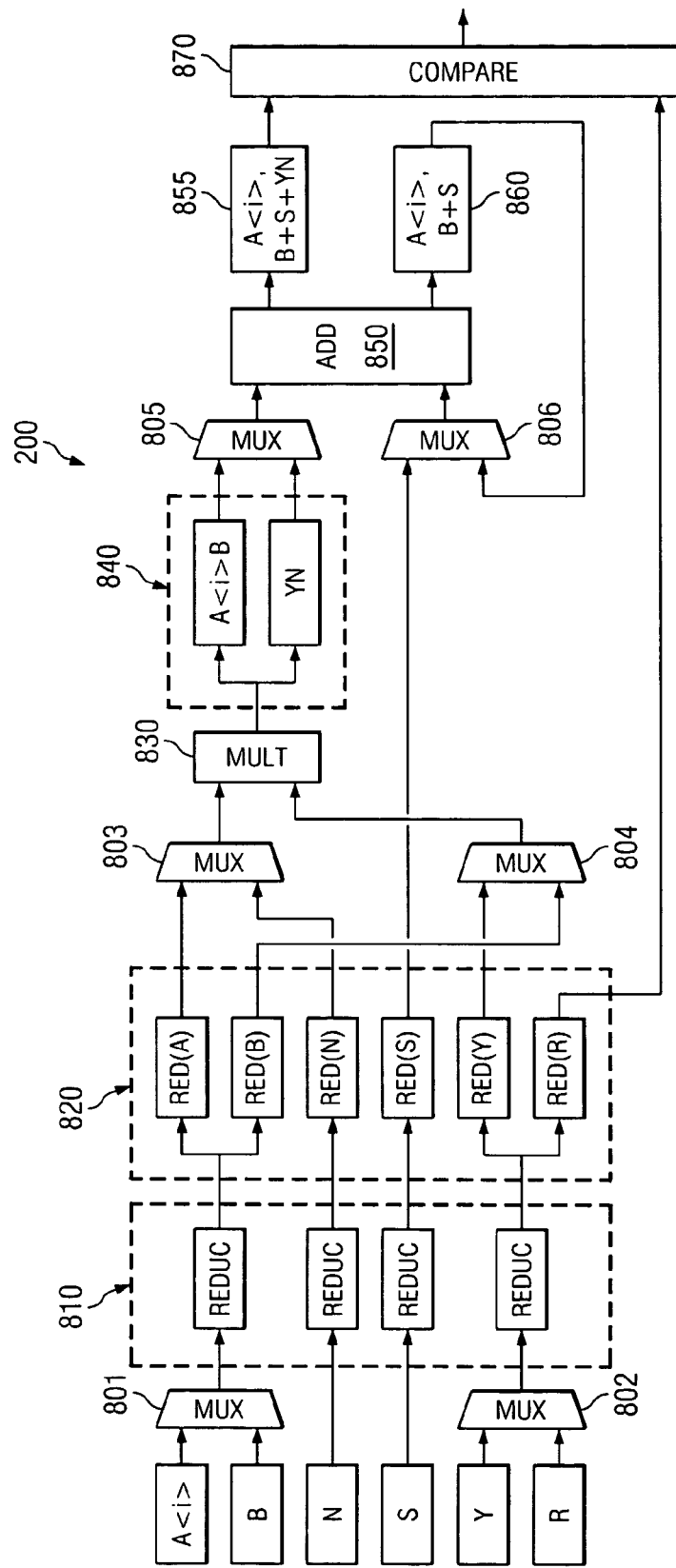
FIG. 8 illustrates the exemplary cryptographic system in FIG. 2 in greater detail according to an exemplary embodiment of the present invention.

FIG. 8 illustrates exemplary cryptographic system 200 in greater detail according to an exemplary embodiment of the present invention. The circuit in FIG. 8 is derived from timing diagram 700. In FIG. 8, the term A<i> is equivalent to $A_i$. Cryptographic system 200 comprises multiplexers 801-806, a block of reduction engines 810, a block of internal registers 820, multiplication with reduction circuit 830, internal registers 840, addition with reduction circuit 850, internal register 855, internal register 860, and comparator 870.

Reduction engines 810 are similar to reduction engine 300 in FIG. 3. Addition with reduction circuit 850 is similar to addition with reduction circuit 400 in FIG. 4. Multiplication with reduction circuit 830 is similar to multiplication with reduction circuit 500 in FIG. 5. Multiplexers 803 and 804 control the flow of data toward multiplication with reduction circuit 830, allowing either red($A_i$·B) or red(Y·N) to be computed.

Multiplexers 805 and 806 control the flow of data toward addition with reduction circuit 850, allowing either allowing either red($A_i$·B+S) or red($A_i$·B+S+Y·N) to be computed. A simple e-bit comparator 870 is the last stage operator, returning a Logic 1 value if the quantities red($A_i$·B+S+Y·N) and red(R) are equal.

The operation of the present invention may be explained by the following example. The value of e is set equal to 8, so that each reduced number is represented by 2 hexadecimal digits. Let A, B, S, N and Y be the numbers given below:

A=D59139E1
B=37A391D_C9193A0E_335C5FA3
S=674E35B9_183FB6EA_7FB9861A
N=8BE15734_23DCEF49_61262B9B
Y=49E3C399
The result R=A·B+S+Y·N is given by:
R=2B466018_3F3291E3_FC34C8DD_00000000
The reductions of A, B, S, N and Y are given by:
red(A)=82
red(B)=91
red(S)=77
red(Y)=8A
red(N)=80
The results of the reduced multiplication/addition are:

red(red(A)·red(B))=EB red(red(N)·red(Y))=45 red(red(A)·red(B)+red(S))=63 red(red(A)·red(B)+red(S)+red(N)·red(Y))=A8

The direct reduction of R is:
red(R)=A8
The last two numbers are the same, therefore the result, R, is consistent with the input data.

Although the present invention has been described with an exemplary embodiment, various changes and modifications may be suggested to one skilled in the art. It is intended that the present invention encompass such changes and modifications as fall within the scope of the appended claims.

What is claimed is:

1. A cryptographic system comprising:
    a first Montgomery-based cryptographic engine receiving a first operand and a second operand and generating therefrom a first result;
    a second Montgomery-based cryptographic engine receiving a first reduced operand derived from said first operand, a second reduced operand derived from said second operand, and a reduced intermediate result derived from an intermediate result generated by the first Montgomery-based cryptographic engine, and generating therefrom a second result, wherein said second Montgomery-based cryptographic engine operates in parallel with said first Montgomery-base cryptographic engine; and
    a first reduction engine for reducing the first result to a first reduced result,
    wherein the first and second reduced operands and the first reduced result are derived using a reduction function that reduces an operand X with respect to a number k by summing all the digits of operand X when represented in base k, to produce a sum, and then dividing the sum by a second number to obtain a modulo remainder.

2. The cryptographic system as set forth in claim 1, wherein the reduction function produces one of: a four-bit digest number and an eight-bit digest number.

3. The cryptographic system as set forth in claim 1, wherein the operand X is represented as an n-bit binary number and k is a power of 2 ($k=2^p$), such that each digit of operand X in base k is a p-bit number.

4. The cryptographic system as set forth in claim 1, further comprising a comparator for comparing said second result to said first reduced result and generating an error flag if said second result and said first reduced result are different.

5. The cryptographic system as set forth in claim 1, further comprising a second reduction engine for reducing said first operand from an N-bit value to a P-bit value, thereby producing said first reduced operand.

6. The cryptographic system as set forth in claim 5, further comprising a third reduction engine for reducing said second operand from an M-bit value to a P-bit value, thereby producing said second reduced operand.

7. The cryptographic system as set forth in claim 6, wherein the first reduction engine reduces said first result from an R-bit value to a P-bit value, thereby producing said first reduced result.

8. The cryptographic system as set forth in claim 7, further comprising a fourth reduction engine for reducing the intermediate result generated by said first Montgomery-based cryptographic engine to thereby produce the reduced intermediate result that is used by said second Montgomery-based cryptographic engine.

9. The cryptographic system as set forth in claim 8, wherein said cryptographic system is disposed in a telecommunication system.

10. The cryptographic system as set forth in claim 9, wherein said telecommunication system comprises a wireless transceiver.

11. The cryptographic system as set forth in claim 9, wherein said telecommunication system comprises a wireline transceiver.

12. The cryptographic system as set forth in claim 1, wherein said reduction function produces a two-digit hexadecimal number when k=16.

13. A method of verifying the operation of a first Montgomery-based cryptographic engine capable of receiving a first operand and a second operand and generating therefrom a first result, the method comprising the steps of:
    generating a first reduced operand from the first operand;
    generating a second reduced operand from the second operand;

generating a reduced intermediate result from an intermediate result generated by the first Montgomery-based cryptographic engine;

inputting the first and second reduced operands and the reduced intermediate result to a second Montgomery-based cryptographic engine and generating therefrom a second result, wherein the second Montgomery-based cryptographic engine operates in parallel with the first Montgomery-base cryptographic engine; and reducing the first result to a first reduced result, wherein the first and second reduced operands and the first reduced result are derived using a reduction function that reduces an operand X with respect to a number k by summing all the digits of operand X when represented in base k, to produce a sum, and then dividing the sum by a second number to obtain a modulo remainder.

14. The method as set forth in claim 13, wherein the reduction function produces one of: a four-bit digit number and an eight-bit digest number.

15. The method as set forth in claim 13, wherein the operand X is represented as an n-bit binary number and k is a power of 2 ($k=2^p$), such that each digit of operand X in base k is a p-bit number.

16. The method as set forth in claim 13, further comprising the steps of:
comparing the second result to the first reduced result; and
generating an error flag if the second result and the first reduced result are different.

17. The method as set forth in claim 13, wherein the step of generating a first reduced operand comprises the step of reducing the first operand from an N-bit value to a P-bit value in a first reduction engine, thereby producing the first reduced operand.

18. The method as set forth in claim 17, wherein the step of generating a second reduced operand comprises the step of reducing the second operand from an M-bit value to a P-bit value in a second reduction engine, thereby producing the second reduced operand.

19. The method as set forth in claim 13, wherein the reduction function produces a two-digit hexadecimal number when $k=16$.

20. The method as set forth in claim 19, wherein the first and second Montgomery-based cryptographic engines are disposed in a telecommunication system comprising one of 1) a wireless transceiver, and 2) a wireline transceiver.

* * * * *